United States Patent
Gebhardt et al.

[11] 3,768,085
[45] Oct. 23, 1973

[54] BLINKER LIGHT CONTROL UNIT

[75] Inventors: Rudolf Gebhardt, Heilbronn; Paul Sieber, Heilbronn-Bockingen, both of Germany

[73] Assignee: Licentia, Patent-Verwaltungs-GmbH, Frankfurt am Main, Germany

[22] Filed: Oct. 29, 1970

[21] Appl. No.: 85,038

Related U.S. Application Data

[63] Continuation-in-part of Ser. No. 834,090, June 17, 1969, abandoned.

[30] Foreign Application Priority Data
Oct. 29, 1969 Germany.................. P 19 54 295.1

[52] U.S. Cl................................ 340/251, 340/81 R
[51] Int. Cl............................................. G08b 21/00
[58] Field of Search....................... 340/81 R, 251

[56] References Cited
UNITED STATES PATENTS

| | | |
|---|---|---|
| 3,002,127 | 9/1961 | Gronjkowski .................. 340/81 R |
| 3,076,123 | 1/1963 | McDermott ..................... 340/251 |
| 3,240,989 | 3/1966 | Grunwaldt ...................... 340/81 R |
| 3,281,611 | 10/1966 | Leeder............................ 340/81 R |
| 3,329,868 | 7/1967 | Domann.......................... 340/81 R |
| 3,422,421 | 1/1969 | Moller............................. 340/81 R |
| 3,263,123 | 7/1966 | Leeder............................ 315/209 |

*Primary Examiner*—Thomas B. Habecker
*Attorney*—Spencer & Kaye

[57] ABSTRACT

A transistorized blinker control unit, particularly for use in an automobile, composed of an oscillator stage arranged to cyclically illuminate selected signal bulbs and to apply a measuring voltage to the selected bulbs during the dark portions of their operating cycles, and an indicator stage arranged to produce a malfunction indication when the measuring voltage changes due to one of the selected bulbs becoming inoperative.

10 Claims, 3 Drawing Figures

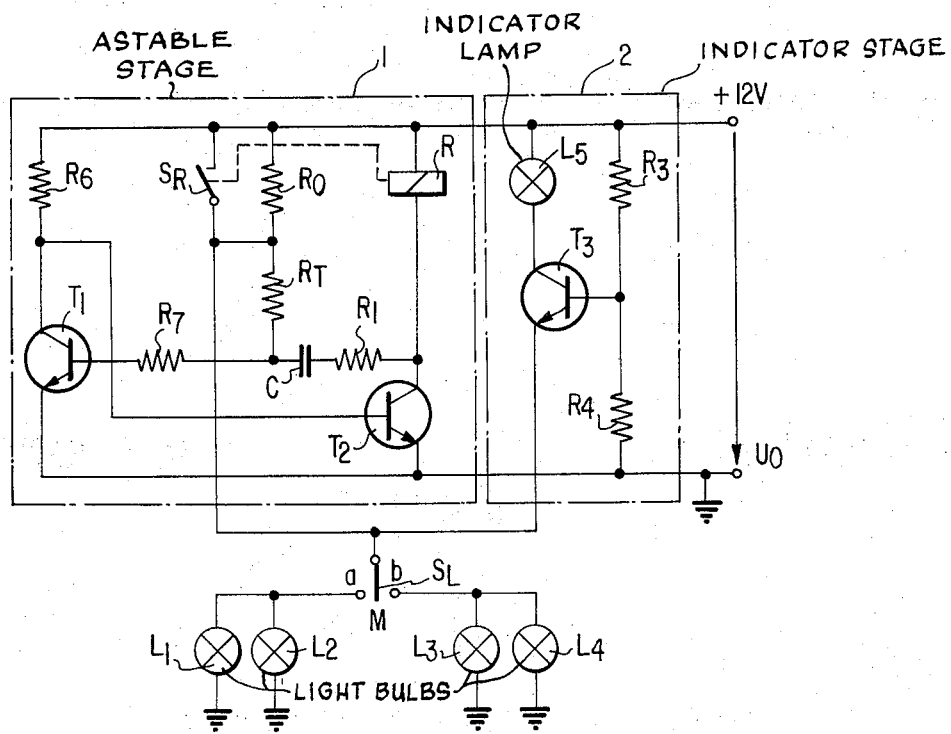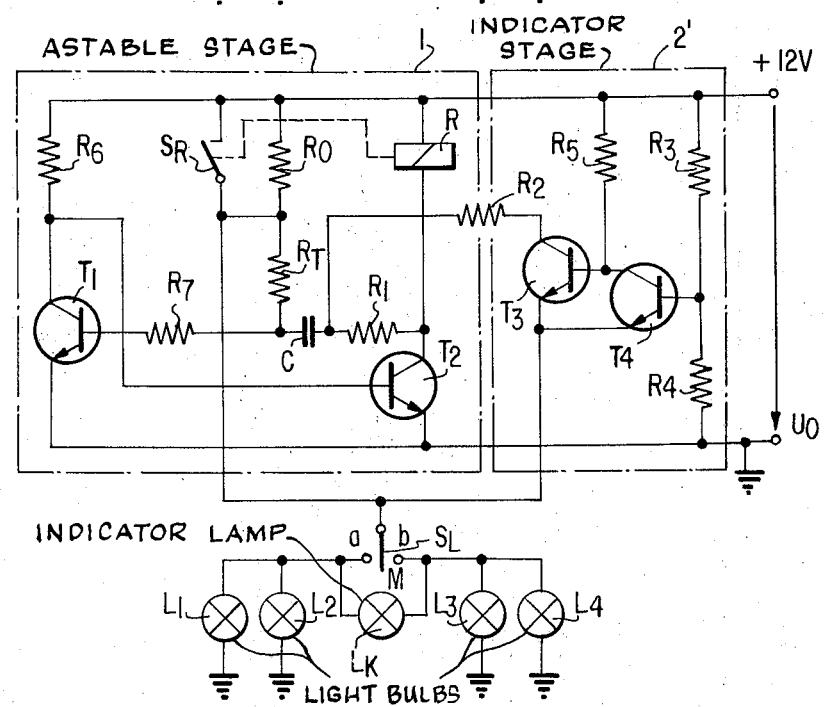

BLINKER LIGHT CONTROL UNIT

CROSS-REFERENCE TO RELATED APPLICATION

This application is a continuation-in-part application of our co-pending application Ser. No. 834,090 filed June 17, 1969, and now abandoned.

BACKGROUND OF THE INVENTION

The present invention relates to blinker light units and particularly to a pulse generator circuit for controlling the lights of such a unit.

Modern automotive vehicles are provided with directional blinker lights and safety warning blinkers whose periodic operation is controlled by various types of circuits. Transistorized circuits which have recently been developed for this purpose have the advantage, compared with conventional relay circuits, of reduced susceptibility to malfunctions and more constant repetition frequency and illumination and dark fractional periods. However, the transistorized circuits developed thus far are relatively complex and/or do not provide a reliable malfunction indication if one of the lamps being controlled should become inoperative i.e. if the lamp should burn out.

SUMMARY OF THE INVENTION

It is a primary object of the invention to overcome these drawbacks and difficulties.

Another object according to the invention is to provide a simple and inexpensive transistorized blinker control circuit.

A further object of the invention is to provide a reliable malfunction indication when one of the connected loads becomes inoperative while permitting the operation of the remaining connected loads to continue.

These and other objects according to the invention are achieved by certain improvements in a pulse generator unit for applying periodic electrical current pulses to at least one selected group of parallel-connected loads, which unit includes an oscillator stage connectable to a voltage source and arranged to oscillate cyclically between a state corresponding to an active fractional period during which an operating current pulse is delivered to the loads and a state corresponding to an inactive fractional period during which the loads do not receive sufficient current to operate. According to the improvement of the invention, there are additionally provided impedance means connected between the voltage source and the loads for delivering to the loads, during each inactive fractional period, a measuring current whose amplitude is less than that required to render the load operative and which produces, across the loads, a voltage drop having a predetermined value when all of the loads of the group are operative and a higher value when at least one of the loads is inoperative, and an indicator stage including a voltage responsive switch connected to the loads for receiving, as its switching voltage, the voltage across the loads. The switch is arranged to be, during each inactive fractional period, in a first switching state when the voltage across the loads has the predetermined value and in a second switching state when the voltage across the loads exceeds that predetermined value.

The circuit according to the invention thus constitutes a unit which will always indicate whether the loads then connected to circuit are all operative or whether one or more of the loads have become inoperative and must be replaced. A circuit according to the invention can be employed in any system where the resistance offered by the connected loads has a different value when one or more of the loads are inoperative than when all the loads are operative. Thus, control circuits according to the invention are particularly applicable to electric bulbs whose resistance becomes substantially equal to infinity when the bulb filament breaks.

The invention is based essentially on the realization that in such systems a current can be sent through such bulbs during the periods when they are not lit, the current amplitude being insufficient to cause the bulbs to light, so that the resulting voltage drop across the bulbs can be monitored and the change in voltage occurring when one of the bulbs becomes inoperative can be utilized to provide an indication that such situation exists.

In accordance with a preferred form of construction of embodiments according to the invention, the voltage-responsive switch is arranged so that, during each inactive fractional period, its switching state changes from that existing during each active fractional period if all of the connected loads are operative, while its switching does not if one or more of the loads should be inoperative.

In accordance with one embodiment of the invention, the appearance of an inoperative load causes the indicator stage to modify the functional behaviour of the oscillator stage in such a manner as to provide a readily observable indication of the existance of an inoperative load.

When a pulse generator unit according to the invention is installed in an automobile to control the directional signal and warning blinker lights of the vehicle, a substantial increase in traffic safety will result due to the continuous monitoring and instantaneous malfunction indication of the blinker bulbs.

The switch according to the invention is preferably constituted by at least one transistor which directly controls the operation of a malfunction indicator element.

BRIEF DESCRIPTION OF THE DRAWINGS

FIG. 1 is a circuit diagram of one preferred embodiment of the invention;

FIG. 2 is a similar circuit diagram of a second embodiment of the invention.

In the drawings, like parts are denoted by like reference numerals.

DESCRIPTION OF THE PREFERRED EMBODIMENTS

Figure 3:
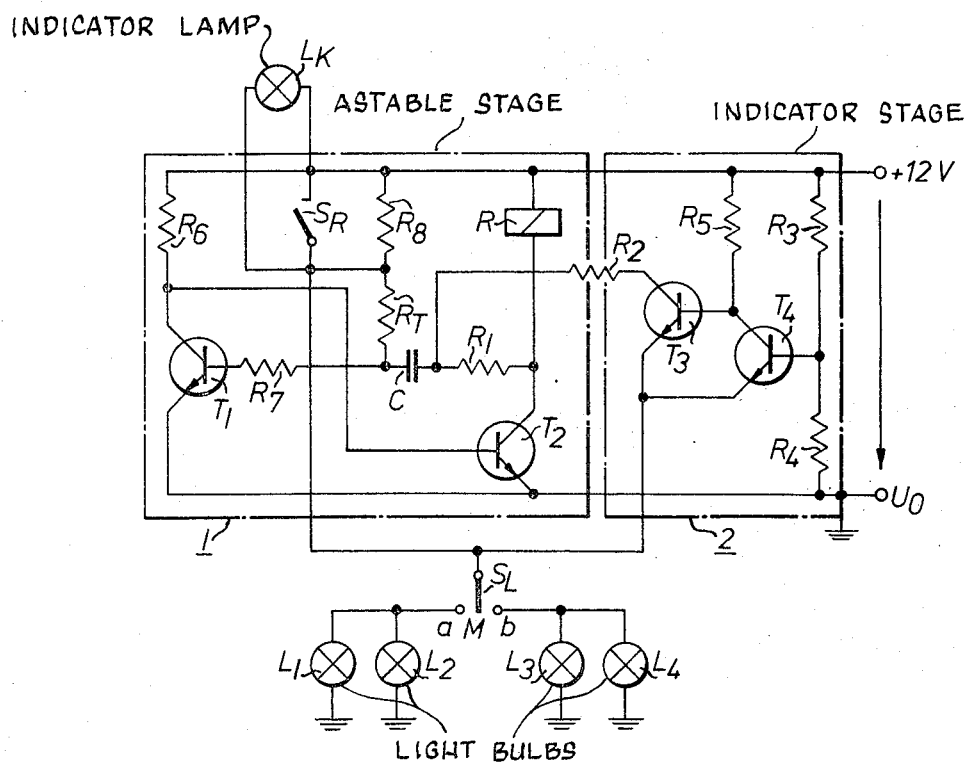
FIG. 3 is a circuit diagram of a modification of the second embodiment of the invention.

The circuit illustrated in FIG. 1 consists essentially of two units, an astable stage 1 and an indicator stage 2. The circuit is arranged for controlling the delivery of illuminating current pulses to a selected pair of loads $L_1$, $L_2$ or $L_3$, $L_4$, these loads here being constituted by bulbs.

The astable stage 1 includes a resistor $R_o$ having one side connectable to the loads. The connection point between resistor $R_o$ and the loads is connected to the emitter of a transistor $T_3$ forming a part of the indicator stage. The base of transistor $T_3$ is connected to a voltage divider composed of resistors $R_3$ and $R_4$. The voltage divider is connected across the 12 volt electrical power source of the vehicle and the values of the resistors $R_3$ and $R_4$ are so selected that the conductive state of the transistor $T_3$ will be determined by the voltage on its emitter, which voltage is in turn determined by the operative state of the loads to which the emitter is connected.

The collector of transistor $T_3$ is connected to an indicator element $L_5$ which indicates the switching state of the transistor, this indicator element being constituted by an electric bulb. This bulb will light up when the transistor $T_3$ is conducting current through its collector - emitter path.

The astable stage 1 consists essentially of two transistors $T_1$ and $T_2$ which may be, for example, npn planar transistors. The emitters of both of these transistors are connected to ground, whereas the collector of transistor $T_1$ is connected via a collector resistor $R_6$ to the positive terminal of the electrical energy supply. The collector of transistor $T_2$ is connected to the same supply terminal via the coil R of a relay forming a part of stage 1 and having a normally opened contact $S_R$ connected across resistor $R_o$. The collector of transistor $T_1$ is connected directly to the base of transistor $T_2$, while the base of transistor $T_1$ is connected to the collector of transistor $T_2$ via a series circuit composed of a base bias resistor $R_7$ of transistor $T_1$, a capacitor C and a further resistor $R_1$. The values of all of these passive components determine the repetition frequency and the duration of the fractional periods of the astable stage.

A voltage divider formed by resistors $R_o$ and $R_T$ is connected between the positive terminal of the energy supply and the connection point between resistor $R_7$ and capacitor C. The connection point between resistors $R_o$ and $R_T$ is connected to a switch $S_L$ and to the emitter of transistor $T_3$. The selector switch $S_L$ has a three - position moveable contact which can be moved to a position a in which it is connected to loads $L_1$ and $L_2$, or a position b in which it is connected to loads $L_3$ and $L_4$, or a middle position M in which it is disconnected from all of the loads. The circuit is placed in a stand-by, or ready, condition when the necessary 12 volt operating potential is applied across its input terminals and the switch $S_L$ is in its M position, i.e. when no loads are connected to the pulse generator. At this time, a base current will flow through resistors $R_o$, $R_T$ and $R_7$ to transistor $T_1$, thus rendering transistor $T_1$ conductive so that the collector voltage of this transistor drops to its saturation value, which is less than the voltage which must be applied to the base of transistor $T_2$ in order to render that transistor conductive. Therefore, transistor $T_2$ remains blocked.

While transistors $T_1$ and $T_2$ are in the states described above, capacitor C charges to a voltage approximately equal to the supplied voltage, with the plate of capacitor C connected to resistor $R_1$ becoming positive and the other plate of capacitor C being substantially at ground potential due to the fact that the resistance of resistor $R_T$ is very high compared with that of resistor $R_o$ and $R_7$. For example, resistor $R_T$ might have a value of the order of 27 kilohms, resistor $R_7$ a value of 2.2 kilohms and resistor $R_o$ a value of 30 ohms.

The circuit then remains in the above-described state until the moveable contact of switch $S_L$ is moved into either position a or position b so as to connect either the parallel arrangement of loads $L_1$ and $L_2$ or the parallel arrangement of loads $L_3$ and $L_4$ to the circuit. When the moveable contact of switch $S_L$ is so moved, practically the entire supply voltage appears across resistor $R_o$ due to the very low resistance offered by the connected loads. In other words, the voltage at the junction between the resistors $R_o$ and $R_T$ drops to a value close to ground potential. This results in a sudden drop in the voltage applied to the base of transistor $T_1$ so that this transistor is rendered non-conductive. The resulting rising voltage at the collector of transistor $T_1$ causes a turn-on voltage to be applied to the base of transistor $T_2$, and this latter transistor becomes conducting. The resulting increased current flow through relay coil R activates the relay to close switch contact $S_R$, thus short circuiting resistor $R_o$ and placing the entire supply voltage across the connected loads to cause the bulbs constituting these loads to light.

When transistor $T_2$ becomes conductive, the potential of that plate of capacitor C which is connected to resistor $R_1$ suddenly drops to the collector saturation voltage of the transistor. However, since the voltage across the capacitor C cannot change abruptly, the potential of the other capacitor plate will assume a negative value and will thus maintain transistor $T_1$ in its non-conducting state. The capacitor then proceeds to be charged in the opposite direction, with a time constant equal to the product of the capacitance of capacitor C and the resistance of the resistor $R_T$, from this initial negative voltage to a positive voltage value. When the plate of capacitor C which is connected to resistor $R_T$ reaches a certain positive value, for example the order of 0.7 volt, transistor $T_1$ will once again become conductive and transistor $T_2$ will return to its non-conductive state, thus causing the current through relay coil R to decrease so as to open contact $S_R$ and extinguish the bulbs constituting the connected loads. This ends the illumination fractional period of the circuit.

During the subsequent dark fractional period, capacitor C is recharged in the opposite direction and the resulting current flowing through the capacitor to the base of transistor $T_1$ maintains this transistor in its conductive state until the charging current through capacitor C has decreased to a value at which the transistor $T_1$ will once again become non-conductive, at which time the operation described above will be repeated, transistor $T_2$ will become conducting and the bulbs of the connected loads will become lighted.

When transistor $T_1$ becomes conductive at the beginning of a dark fractional period, the current through capacitor C initially has a value of $I_{max} = U_o/(R_1+R_7)$, where $U_o$ is the supply voltage for the circuit. This current decreases at a rate determined by the time constant $C(R_1 + R_7)$.

During each dark fractional period, a measuring current flows through resistor $R_o$ and the connected load bulbs and this produces a predetermined voltage drop across the loads. The value of this voltage drop depends on the resistance of the resistor $R_o$ and is applied to the emitter of transistor $T_3$ in indicator stage 2. An indicator bulb $L_5$ is connected between the collector of transistor $T_3$ and the positive terminal of the electric energy supply. The transistor $T_3$ can also be an npn planar transistor.

The voltage at the base of transistor $T_3$ is determined by the resistance value of resistors $R_3$ and $R_4$ and is so selected that the transistor will become conductive during each dark fractional period of the circuit if the connected loads are operative. In other words, transistor $T_3$ will become conductive only when its emitter voltage is below a predetermined value. The voltage will be below this value only when contact $S_R$ is open, so that resistor $R_o$ is in series between the connected loads and the voltage supply, and when both connected loads are operative, i.e. not open circuited. If the contact $S_R$ is closed, the voltage on the emitter of transistor $T_3$ will be equal to the positive supply voltage and the transistor will not conduct. On the other hand, if the contact $S_R$ is open, but one of the load bulbs has a broken filament, this will result in an increase in the effective load resistance and will also cause the voltage on the emitter of transistor $T_3$ to be above the value at which the transistor can conduct.

Thus, transistor $T_3$ will always be non-conductive during each illumination fractional period of the circuit and will become conductive during each dark fractional period, thus causing bulb $L_5$ to light periodically at the repetitious frequency of the astable stage. However, if one of the connected load bulbs becomes inoperative, i.e. its filament breaks, the voltage on the emitter of transistor $T_7$ will never drop to a value sufficient to render the transistor conductive and the bulb $L_5$ will remain unlighted, thus providing an indication that one of the load bulbs is no longer operating.

Turning now to FIG. 2, there is shown another embodiment of the circuit according to the invention which includes an astable stage 1 essentially identical with the astable stage of FIG. 1 and an indicator stage $2'$.

The circuit of FIG. 2 differs from that of FIG. 1 in that it includes a resistor $R_2$ connected to the junction between the capacitor C and the resistor $R_1$ to form a voltage divider with the resistor $R_1$. The other side of the resistor $R_2$ is connected to the collector of transistor $T_3$ of the indicator stage $2'$. The indicator stage $2'$ further includes a transistor $T_4$ connected essentially in cascade with the transistor $T_3$ and having its base connected to the center point of the voltage divider constituted by resistors $R_3$ and $R_4$. A further resistor $R_5$ is connected between the positive terminal of the voltage supply and the base of transistor $T_3$. The circuit is arranged so that if one of the connected load bulbs becomes inoperative the load voltage of the capacitor C is reduced with respect to the load voltage existing when the connected loads are operative by an amount which is determined by the ratio of the voltage division produced by resistors $R_1$ and $R_2$ so as to cause the repetition frequency of the astable stage to be correspondingly increased.

This action is controlled by the switch constituted by transistors $T_3$ and $T_4$, which are preferably of the same type, e.g. both of the npn type. The voltage drop across the connected loads is applied to the emitters of both transistors, while the collector of transistor $T_4$ is connected directly to the base of transistor $T_3$ so that the collector of transistor $T_4$ is connected to the positive terminal of the voltage supply via resistor $R_5$. Resistor $R_1$ is identical with, and performs the same function in the astable stage 1 as, the identically numbered resistor in the circuit of FIG. 1.

Similarly, the voltage divider composed of resistors $R_3$ and $R_4$ is identical with the corresponding resistors in the circuit of FIG. 1, their values being so selected as to enable transistor $T_4$ to become conductive only when the voltage on its emitter is at the low value which exists when the contact $S_R$ is open and the connected loads are all operative, i.e. not open circuited.

The time constants for the astable stage 1 are the same as those described above with reference to FIG. 1. When, due to one or more of the connected loads becoming inoperative, the emitter voltage on transistors $T_3$ and $T_4$ rises above the low value referred to above, transistor $T_4$ becomes non-conductive, causing the voltage on the base of transistor $T_3$ to rise substantially and to render transistor $T_3$ conductive. This places one side of the voltage divider $R_2$, $R_1$ at a potential equal to the sum of the emitter voltage and the collector saturation voltage of transistor $T_3$. As a result, capacitor C will only be chargeable to a maximum voltage of $U_o \cdot R_2/(R_1 + R_2)$. The maximum recharging current of the capacitor will be correspondingly reduced to a value $I_{max} = R_7 \cdot U_o/(R_1 \cdot R_2 + R_2 \cdot R_7 + R_1 \cdot R_7)$, and this current will decrease to zero at a rate determined by the time constant $C (R_7 + R_1 \cdot R_2/R_1 + R_2)$.

Due to the reduction in the voltage to which capacitor C charges during a dark fractional period when an inoperative load is present, as well as the corresponding reduction in the current decay time constant, the duration of the dark fractional periods will be reduced. Similarly, the duration of the illumination fractional periods is reduced because the lower voltage across the capacitor at the start of each such period reduces the time required for recharging the capacitor in the opposite direction to the voltage required for rendering transistor $T_1$ conductive.

On the other hand, when all of the connected loads are operative, transistor $T_3$ will be non-conductive during each dark fractional period of the circuit so that one side of resistor $R_2$ will be effectively open circuited at all times. As a result, the stage 1 will operate during the dark fractional period in the manner described above with reference to FIG. 1.

If the resistance values of the resistors $R_1$ and $R_2$ are appropriately selected so that the maximum charging current and voltage of the capacitor C are reduced to one-half the values attained when all loads are operative, the repetition frequency of the astable stage 1 will be doubled when one or more loads are inoperative since both the illumination and dark fractional periods of the astable stage will then have a duration of about one-half that which exists when all connected loads are operative.

The circuit further includes an indicator lamp $L_k$ connected between the two terminals $a,b$ of switch $S_L$. The impedance of lamp $L_k$ is suitably selected with respect to the impedances of the load bulbs so that the voltage drop across the lamp $L_k$ will be greater than that across the load bulbs which are not connected to the voltage supply by an amount sufficient to cause the indicator lamp $L_k$ to light while the load bulbs which are not connected to the voltage supply, and hence which are in series with the lamp $L_k$, will not light. The indicator lamp $L_k$ will light in synchronism with the connected load bulbs so that when one of these latter bulbs becomes inoperative, the illumination frequency of lamp $L_k$ will double and thus provide an obvious and unmistakable indication that one of the load bulbs has become inoperative.

The repetition frequency of the circuit can, of course, be varied in any other desired manner by an appropriate selection of the resistance values of resistors $R_1$ and $R_2$.

In some cases, the power dissipation of the resistor $R_o$ can have a disturbing effect in the integrated circuit because it can cause excessive generation of heat. In the embodiment illustrated in FIG. 3, the resistor is withdrawn from the astable stage and takes the form of the indicator lamp $L_k$ which is located in a suitable position for the indication. A further resistor $R_8$ is connected in parallel with the lamp $L_k$ and except for the removal of the lamp bridging switch M the circuit illustrated in FIG. 3 is otherwise identical to the circuit illustrated in FIG. 2.

The circuit shown in FIG. 3 functions as follows: when the switch SL is in the position M, that is to say when no loads are connected to the pulse generator, a base current flows through the resistors $L_k$, $R_T$, $R_7$ to the transistor $T_1$. As a result, the transistor $T_1$ becomes conducting and its collector potential drops to the collector saturation voltage which is lower than the base forward voltage of the transistor $T_2$. The transistor $T_2$ remains cut off. The capacitor C is charged substantially to the value of the supply voltage. If the switch $S_L$ is switched over into the position $a$ or $b$, that is to say if two parallel-connected loads $L_1$ and $L_2$ or $L_3$ and $L_4$ are connected to the pulse generator for example, substantially the entire supply voltage drops at the indicating lamp $L_k$ because the lamp has a very low resistance so that the potential at the junction between $L_k$ and $R_T$ jumps substantially by the value of the supply voltage. As a result, the transistor $T_1$ is cut off and the transistor $T_2$ becomes conducting as a result of the rising collector potential of $T_1$. A higher collector current flows through the relay R and closes the switch $S_R$. Thus the indicating lamp $L_K$ is also bridged and the lamps $L_1$ and $L_2$ are connected directly to the source voltage and light up.

The indicating lamp $L_k$ thus always lights up in the intervals in operation of the load lamps.

Since, after the switching on of the load lamps, the voltage at the capacitor cannot jump, this reverses its charge with a specific time constant. At a specific positive voltage, the transistor $T_1$ again becomes conducting and the transistor $T_2$ is cut off, the relay releases and the light phase is at an end.

A resistor $R_8$, which is connected in parallel with the switch and with the indicating lamp $L_k$, has a relatively high resistance and ensures that the pulse generator continues to function even in the event of failure of the tell-tale lamp.

If the voltage divider $R_1$, $R_2$ is so dimensioned that the maximum charge-exchange current and the maximum charging voltage of the capacitor are reduced by half in comparison with operation with intact loads, the pulse repetition frequency of the generator is doubled in consequence because the duration of the intervals in operation and the operating periods is reduced substantially by half in comparison with operation with intact loads.

Thus in the event of failure of a load, the tell-tale lamp $L_K$ will go on and off at twice the normal rate.

According to one exemplary form of construction of the circuits illustrated in FIG. 1 to 3, the various components can have the following values:

$R_1$ = 1.5 Kilohm,
$R_2$ = 2.2 Kilohm,
$R_3$ = 15 Kilohm,
$R_4$ = 2.4 Kilohm,
$R_5$ = 13 Kilohm,
$R_6$ = 4.3 Kilohm,
$R_7$ = 2.2 Kilohm,
$R_0$ = 30 Ohm,
C = 15 uF 15 volt,
$U_o$ = 12 volt,
$L_1$, $L_2$, $L_3$ and $L_4$ = 12 volt, 18 Watt Bulbs.

With the exception of the capacitor C, the bulbs, the relay and possibly the resistor $R_o$, all of the other components of the circuit can be constructed in the form of an integrated circuit fabricated according to the thick or thin film technique or the circuit may be formed on a common semiconductor wafer. The circuit could also be constructed using pnp transistors, in which case it is only necessary to reverse the polarity of the connections to the voltage supply.

Directional blinker units according to the invention can also be arranged to function as safety warning blinkers by short circuiting the terminals a, b of switch $S_L$ together so that all four loads will be turned on and off simultaneously.

It will be understood that the above description of the present invention is susceptible to various modifications, changes and adaptations.

What is claimed is:

1. In a pulse generator unit having an input for connection to a voltage source and an output for connection to a selected group of parallel connected loads for applying periodic electrical current pulses to the selected group of parallel-connected loads,
the pulse generator unit including: an oscillator stage connected between the input and the output for producing an output signal oscillating cyclically between a value corresponding to an active fractional period during which an operating current pulse is delivered to the loads and a value corresponding to an inactive fractional period during which the loads do not receive sufficient current to operate; impedance means connected between the input and the output; switching means controlled by the output signal from said oscillator stage and operatively connected to said impedance means for causing said impedance means to have a low impedance value which creates a current flow to place said loads into operation during each active fractional period, and to have a high impedance value which creates a current whose amplitude is less than that required to place the loads into operation during each inactive fractional period, the current flow during each inactive fractional period producing, across the loads, a voltage drop having a predetermined value when all of the loads of the selected group are operative and a higher value when at least one of the loads is inoperative; and an indicator stage connected to the output for monitoring the voltage across the loads and producing an indication representative of the value of that voltage, the improvement wherein:

said oscillator stage includes only a single capacitor connected for determining the duration of both the active and inactive fractional periods, and said indicator stage includes: voltage responsive switch means having a control input connected to the output of said unit to receive the voltage across the loads, which voltage places said switch means in an operative switching state during an inactive fractional period only when the voltage across the loads is greater than said predetermined value; and a voltage divider having one end connected to said switch means, with an intermediate point of said voltage divider being connected to one side of said capacitor, said switch means and voltage divider being connected together for varying the maximum voltage to which said capacitor charges during each inactive fractional period by an amount proportional to the voltage division ratio of said voltage divider only when said switch is in its operative switching state, so as to vary the repetition frequency of the output of said oscillator stage when an inoperative load is present.

2. An arrangement as defined in claim 1, wherein said impedance means include an indicating lamp.

3. An arrangement as defined in claim 2, wherein said oscillator stage further includes: a resistor; and means connecting said resistor in parallel with said indicating lamp, said resistor having such a high resistance that the pulse generator functions even in the event of failure of said indicating lamp.

4. An arrangement as defined in claim 1 wherein said switch means comprises two transistors of the same type, said indicator stage further includes: means connecting the collector electrode of one of said transistors to the base electrode of the other of said transistors and to the input of said unit, said end of said voltage divider which is connected to said switch means being connected to the collector electrode of the other of said transistors, said control input of said switch means being connected to the emitter electrodes of both said transistors, so that their emitter electrodes are connected to the output of said unit, and said oscillator stage further includes: at least one transistor which is arranged to be non-conductive during each inactive fractional period and which has its collector electrode connected to the other end of said voltage divider.

5. An arrangement as defined in claim 4 wherein said indicator stage further includes: a second voltage divider having one end connected to the input of said unit; means connecting an intermediate point of said second voltage divider to the base of said one of said transistors of said switch means for applying thereto a voltage which enables said one of said transistors to become conductive during each inactive fractional period when all of said loads are operative; whereby said other transistor of said switch means becomes correspondingly non-conductive, whereas during each inactive fractional period when an inoperative load is present the potential on the emitter of said one of said transistors causes that transistor to become non-conductive, whereby said other transistor becomes correspondingly conductive so as to place said one end of said first-defined voltage divider at a voltage substantially equal to the voltage across said load.

6. An arrangement as defined in claim 1 wherein said oscillator stage includes a first transistor connected so that its collector-emitter path is non-conductive during each inactive fractional period and conductive during each active fractional period, said switching means includes a relay coil connected in the collector path of said transistor and said impedance means includes a normally-open contact operated by said coil, said coil closing said contact so as to give said impedance means its low impedance value whenever the collector-emitter path of said transistor is conductive, the low impedance value constituting a short circuit which places said loads directly across the output of the voltage source during each operative fractional period.

7. An arrangement as defined in claim 6, wherein said oscillator stage is constituted by an astable circuit and further includes: a second transistor of the same type as said first transistor; and means connecting said collector electrode of said second transistor to said base electrode of said first transistor; and said voltage divider comprises at least one resistor connected in series with said capacitor, between said base of said second transistor and said collector of said first transistor; and a further resistor connected to the connection point between said at least one resistor and said capacitor.

8. An arrangement as defined in claim 7, wherein said oscillator stage further includes: an additional resistor connected in series between said impedance means and the base of said second transistor, said additional resistor having a substantially higher resistance than the high impedance value of said impedance means, the resistance of said additional resistor and the capacitance of said capacitor substantially determining the discharge time constant of said capacitor during each active fractional period.

9. An arrangement as defined in claim 8 wherein said oscillator stage further includes: selector switch means; means connecting one side of said selector switch means to the junction between said impedance means and said additional resistor; and means connecting the other side of said selector switch means to the selected group of loads, to cause said loads to operate as soon as said selector switch means is switched to close the circuit between said selected group of loads and the junction between said impedance means and said additional resistor.

10. An arrangement as defined in claim 9 wherein all of said transistors are npn planar transistors.

* * * * *